United States Patent [19]

Huf et al.

[11] 3,734,778
[45] May 22, 1973

[54] METHOD FOR PRODUCING A SPIRALLY WOUND ELECTROLYTIC CELL

[75] Inventors: Leonard F. Huf, Wheatridge; Phillip A. Grossman, Lakewood; Roland L. Young, Denver; Robert E. Stark, Littleton, all of Colo.

[73] Assignee: The Gates Rubber Company, Denver, Colo.

[22] Filed: May 10, 1971

[21] Appl. No.: 141,877

[52] U.S. Cl. ........................................ 136/13, 136/176
[51] Int. Cl. ............................................. H01m 35/16
[58] Field of Search..136/13–14, 175–176, 112, 113; 242/55; 29/400

[56] References Cited

UNITED STATES PATENTS

| 3,373,060 | 3/1968 | Gray | 136/13 X |
| 3,494,800 | 2/1970 | Shoeld | 136/176 |
| 3,565,690 | 2/1971 | Jochaud Du Plessix et al. | 136/13 |

Primary Examiner—Anthony Skapars
Attorney—Raymond Fink, H. W. Oberg, Jr. and Curtis H. Castleman, Jr.

[57] ABSTRACT

An electrolytic cell pack consisting for instance of opposite polarity electrodes and alternate interposed separator is spirally wound by (a) attaching a thin flexible leader tab having a folded end to the cell pack, (b) curling the folded end of the leader tab in a spiral manner, (c) bringing a winding mandrel next to the thus formed curl and rotating the mandrel in the direction of the curled tab to thereby uncurl the leader tab and engage its folded end into a peripheral receiving portion of the mandrel, and (d) further rotating the mandrel to form the spiral wound cell pack. The described winding method is particularly suitable for spirally winding under firm stack pressure relatively small diameter cell packs such as may be required in rechargeable alkaline battery cells. The stack pressure achieved by the winding method is maintained by inserting a retainer in the axial void of the cell pack.

16 Claims, 5 Drawing Figures

INVENTORS
L.F. HUG
P.A. GROSSMAN
R.L. YOUNG
R.E. STARK

BY *Curtis H. Castleman, Jr*
ATTORNEY

Patented May 22, 1973

INVENTORS.
L. F. HUG
P. A. GROSSMAN
R. L. YOUNG
R. E. STARK

BY Curtis H. Castleman Jr
ATTORNEY

METHOD FOR PRODUCING A SPIRALLY WOUND ELECTROLYTIC CELL

BACKGROUND OF THE INVENTION

This invention relates to spiral wound electrolytic cells, and methods of winding the same, and especially where high stack pressure of the cell pack is required.

It has long been recognized that cells of the spirally wound or so-called jelly roll type offer advantages of high power density and ease of automatic assembly. It is also known that certain types of rechargeable alkaline cells require firm stack pressure among the components of the cell pack to improve the life of the cell, particularly in cells where dendrite growths cause internal short circuiting. To obtain this relatively high stack pressure it has been the common practice to use slotted or collapsible mandrels having fairly large diameters to accommodate the torques encountered during winding. When smaller diameter mandrels have been used, it has previously been necessary to employ driven pressure rollers to obtain the torque—with the result that the cell pack is subjected to an abrasive circumferential force. Neither of these methods have been satisfactory for the so-called mini-type cells, e.g., the AA size which cannot be wound with such large mandrels or be subjected to such abrasive forces and still provide suitable mechanical integrity, energy densities and discharge capacities. The most suitable mandrel for this type of cell is one of the driven type that will withstand the torques supplied and yet leave only a small axial void (relative to the diameter of the cell) when the cell pack is removed from the mandrel.

While as previously mentioned it has been advantageous to minimize the volume occupied by the axial void found in the cell pack, some void is necessary for recombination of evolved gases within the cell. There is a tendency for this void to become drastically reduced in size or to diminish completely when electrolyte is initially added to the cell and the cell pack undergoes radial inward expansion. As a result, the configuration of the spirally wound electrodes is distorted, stack pressure is compromised and the axial void for gas recombination is lost.

It is a primary object of the present invention to overcome drawbacks of conventional winding methods, including those enumerated above, for producing spirally wound cell packs for electrolytic cells. It is a further object to produce a relatively small diameter cell pack using a small diameter solid mandrel yet produce high stack pressure among the components of the cell pack. It is another object to allow the use of an open face winding machine which will accommodate easy maintenance. It is still another object of the invention to maintain a small axial void within the electrolytic cell even after electrolyte has been added to the cell or cell operation has commenced.

These and other objects are provided for by the present invention as explained in more detail hereafter.

SUMMARY OF THE INVENTION

Briefly described, the invention comprises a method for producing a spirally wound electrolytic cell pack consisting of a plurality of layers, the steps including (1) folding one end of a thin flexible leader tab and affixing the other end of the tab to the leading edge of the cell pack to be wound, (2) curling in a spiral manner the folded end of the leader tab, (3) bringing the curled tab into contact with a driven mandrel having peripheral receiving means, e.g., splines, the mandrel being made to rotate in the direction of the curled tab to thereby uncurl the leader tab and engage its folded end in the spline of the mandrel, and (4) further rotating the mandrel and preferably employing idling pressure rolls to form the spiral wound cell pack with the desired stack pressure.

After the spiral wound cell pack is disengaged from the winding mandrel, an axial void remains. In one embodiment of the invention, after the spiral cell pack is inserted in a suitable container, a porous or discontinuous retaining means, resistant to the cell environment, is inserted in this axial void to maintain stack pressure of the cell pack and an axial avenue for recombination of gasses evolved during cell operation.

While electrolytic cells utilizing the methods and apparatus of the present invention may be of various configurations and sizes, the invention is particularly effective for the manufacture of relatively small diameter rechargeable electrolytic cells in which high stack pressure and maintenance of an axial void are required for long cell life and high performance. Examples of such cells include sealed rechargeable alkaline nickel-cadmium and nickel-zinc sub-C and AA sizes. In turn, these cells have found substantial use in appliances, scientific equipment and toys, for example.

BRIEF DESCRIPTION OF THE DRAWINGS

The invention will be more readily understood by reference to the accompanying drawings, in which like numerals designate like parts in the several figures, and wherein.

PREFERRED EMBODIMENTS OF THE INVENTION

Figure 1A:
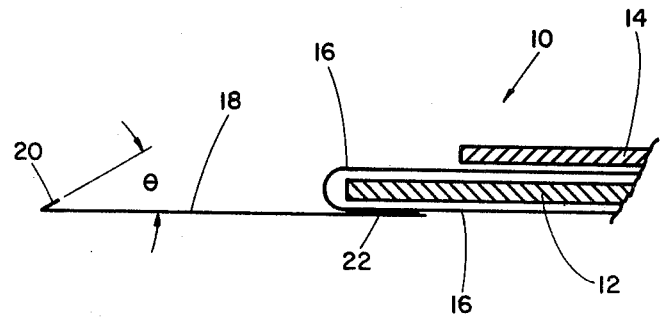
FIG. 1 depicts in three figures one preferred method of winding according to the invention.

Referring to FIG. 1, there is shown a sequence of initial steps preparatory to winding a cell pack according to one embodiment of the invention. In FIG. 1a, the cell pack to be wound is generally designated at 10 and consists of negative electrode 12 and positive electrode 14 sandwiching separator 16 which is folded about the negative electrode in the manner shown. A thin flexible leader tab 18, which may be made of, for example, paper, polyethylene, sausage casing, various copolymeric materials and polymeric impregnated paper, is securely affixed to the leading edge of the cell pack at 22, such as by use of a suitable adhesive. The other end of the leader tab is provided with a small foldback 20, where the angle of the fold $\theta$ with the horizontal is preferably less than about 90°, more preferably less than about 45°, and most preferably less than about 15°. This angle and the length of the foldback are chosen according to the geometry of the peripheral receiving portion of the mandrel for proper engagement therewith.

Figure 1B:
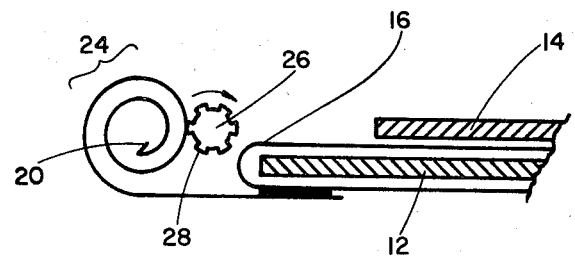

The next step of the method involves curling the foldback portion of the leader tab toward the cell pack as shown in FIG. 1b. Curling may be accomplished manually, mechanically, by application of heat or steam or otherwise wound preferably to at least one turn, and more preferably to at least two full turns and most preferably to at least four full turns. Next, the curl 24 is brought in contact with driven mandrel 26 having at least one engaging spline 28. It is preferred that the height of each individual spline 28 is small in comparison with the overall diameter of the mandrel to increase its torque withstand capability.

Figure 1C:
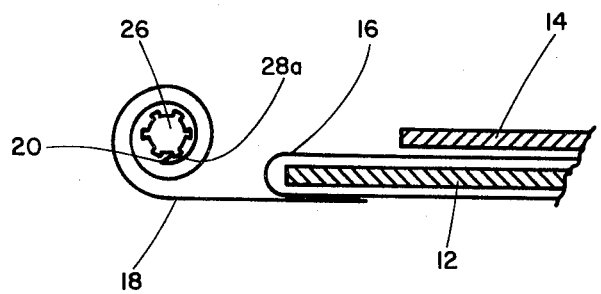

The mandrel 26 is made to rotate in the direction of the curl (clock-wise in the embodiment shown) to thereby unwind the curl until the foldback 20 comes into contact with and engages one of the splines 28a. As rotation of the mandrel continues, the leader tab begins to wind about the mandrel as shown in FIG. 1c. It should be noted that a relatively small foldback angle θ is necessary in this embodiment to prevent the foldback portion 20 from slipping off the mandrel. If the foldback is substantially normal to the spline wall, suitable engagement is generally achieved. Once engagement has taken place, and preferably after the leader tab has been wound to the point that the leading edge of the cell pack abuts the wound leader tab, the speed of rotation of the mandrel may be elevated to speed up the winding process; the cell pack 10 then begins to spirally wind itself into the desired form.

While a preferred type of mandrel has been described and shown having a plurality of splines, in which adjacent splines preferably have approximately parallel walls, there are other types of mandrels that would be suitable and would be suggested to those skilled in the art. Thus, a sawtooth type configuration would also be useful, as well as a star wheel configuration. The mandrel, in general, should be provided with alternate upstanding or radial projection(s) and contiguous depression(s) in which the leader tab foldback will engage. It should be noted that the way the leader tab engages with the mandrel allows easy disengagement of the spirally wound cell pack after winding so that the use of an adhesive, tape, or other conventional means to secure engagement with the mandrel is obviated.

If desired, disengagement of the spiral wound cell pack from the mandrel may be done in such a manner as to sever the leader tab from the cell pack, although it is suitable to leave it as an integral part of the cell pack and incorporate it in the finished electrolytic cell without adverse effect.

Figure 2:
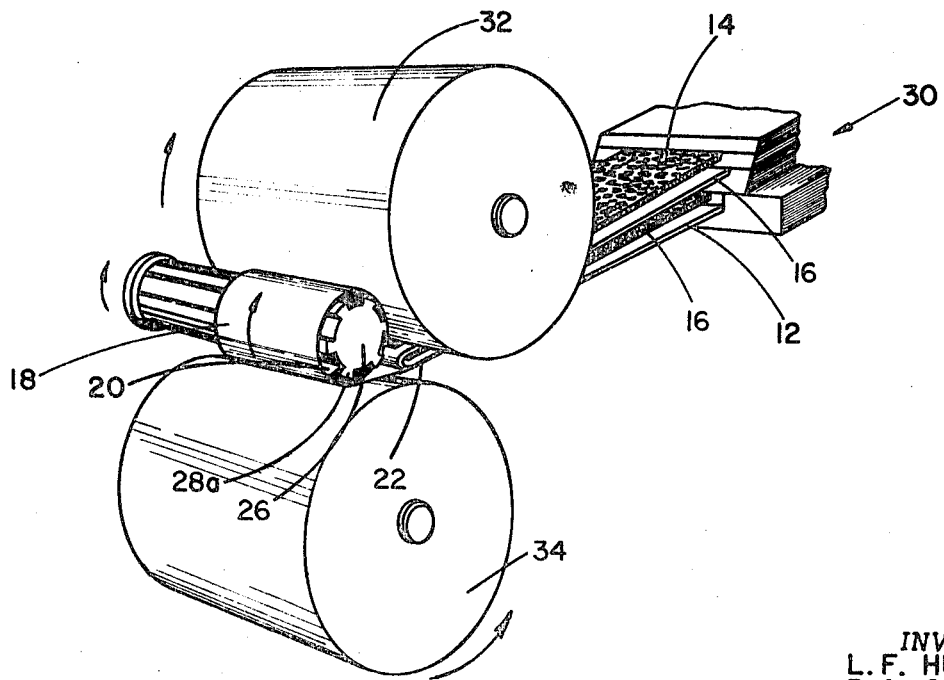
FIG. 2 depicts in perspective one embodiment for winding the cell pack under pressure.

One of the preferred winding embodiments according to the invention is shown in perspective in FIG. 2. A guide 30 supplies components of the cell pack which, through the leader tab connection 18, are engaged with mandrel 26 via spline 28a according to the method shown and described with reference to FIG. 1. Idling pressure rollers 32 and 34 bear directly onto the cell pack as it is being wound, and, in conjunction with the tension provided by the mandrel, supply the necessary pre-determined stack pressure to the cell pack. It is preferred to apply the pressure rollers once the leading edge of the cell pack begins to wind. The mandrel is rotated clockwise by an external source of power, e.g., electrically or hydraulically in a rapid manner until the spirally wound configuration is obtained. Alternatively, additional pressure rollers may bear directly onto the cell pack as it is being wound. Thus, it would be suitable to have a third pressure roller (not shown) adjacent to the lower left side of the mandrel and bearing against the winding cell pack. The pressure rollers for instance, may be suitably provided with compression springs with spring constants chosen to provide the predetermined stack pressure required.

Figure 3:
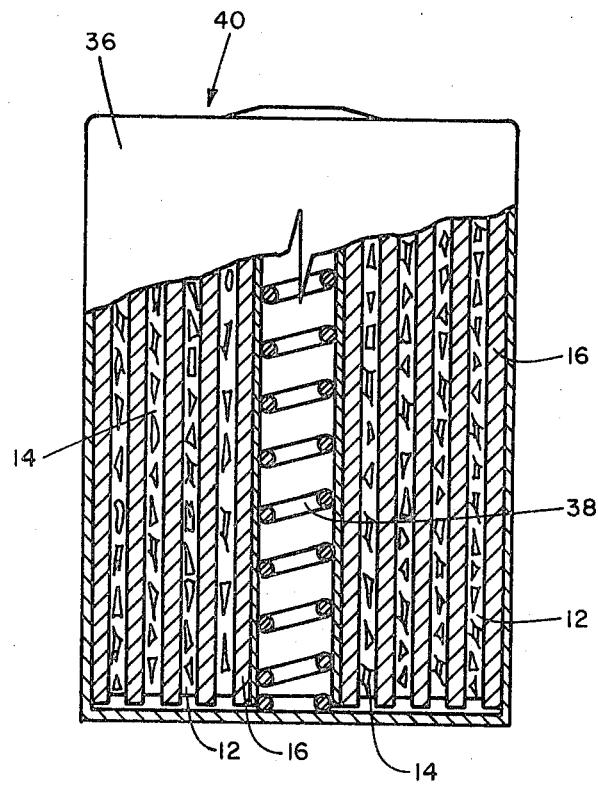
FIG. 3 is a cut-away view of a sealed electrolytic cell including an axial retaining means.

In FIG. 3, an electrolytic cell 40 comprises a casing 36 and a spirally wound cell pack consisting of negative plate 12, positive plate 14, and interposed separator 16 under firm stack pressure wound in accordance with the previously described method of this invention. A retaining member 38 consisting of a suitable electrolyte resistant helical spring of plastic or other material is inserted in the axial void of the cell pack once the cell pack has been loaded into the container 36, but preferably prior to addition of electrolyte. This retainer is porous or discontinuous to allow oxygen and other gases to diffuse and recombine within the axial void. At the same time, the retainer 38 is of sufficient strength to prevent the axial void from collapsing upon expansion of the cell pack once electrolyte is added. The material may be substantially rigid or somewhat elastomeric to allow some cell pack expansion. In this manner stack pressure is retained along with the necessary axial void for the mode of operation of a sealed cell. Various types of retainer configurations other than the plastic spring shown are within the scope of the invention and will be made readily apparent to those skilled in the art. For instance, a porous plastic sleeve would be suitable.

As an illustrative embodiment of the invention, cell packs for rechargeable alkaline cell of the 1/3 AA size are wound on a bristol spline driven mandrel of about 1/8 inch diameter with three adjacent idling pressure rollers to produce a stack pressure of at least 100 psi. Two of these spiral stacks thus made are loaded into identical containers. Into the axial void of one is inserted a helical plastic coil, into the other, nothing. Electrolyte is added and the cells sealed for operation. The cell with the axial retaining spring has a much longer charge/discharge cycle life and lower internal pressure than the control cell.

It should be understood that the invention is capable of a variety of modifications and variations which will become apparent to those skilled in the art upon a reading of the present specification and these are to be included within the scope of the claims appended hereto. For instance, while the method of winding as described with reference to FIG. 1 details a particular sequence of steps, this sequence is not critical and various combinations are envisioned. For instance, the curling operation may precede the step of affixing the leader tab to the cell pack. Furthermore, the order of stacking of the cell pack and placement of the interposed separators could easily be altered without departing from the scope of the invention. For instance, the separator 16 may be in two separate layers rather than one continuous folded layer as shown in FIG. 1a. Additionally, for certain applications the aforementioned leader tab could be provided by merely extending one of the separator layers of the cell pack, thus forming an integral thin flexible layer serving a dual function.

What is claimed is:

1. A method for producing a spirally wound electrolytic cell pack consisting of a plurality of layers, said method comprising:
   a. curling a first folded end of a thin flexible leader tab, the other end of said tab securely affixed to said cell pack;
   b. bringing said curled tab into contact with a winding mandrel having at least one peripheral receiving portion, said mandrel being made to rotate in the direction of the curl thereby uncurling said leader tab thereby engaging said folded end of the leader tab in said receiving portion of the mandrel; and c. further rotating said mandrel to form the spiral wound cell pack.

2. The method of claim 1 wherein the cell pack layers comprise opposite polarity electrodes sandwiching alternate separator layers.

3. The method of claim 1 wherein the elctrolytic cell pack is used as the contents of an alkaline rechargeable battery cell.

4. The method of claim 1 wherein the leader tab is curled for at least one full turn.

5. The method of claim 1 wherein step (a) consists of conducting the operations in the following sequence: folding one end of the leader tab, then curling the folded end, followed by securely affixing the other end of the leader tab to the cell pack.

6. The method of claim 1 wherein the rotational speed in step (b) is relatively slower than the rotational speed in step (C).

7. The method of claim 1 wherein the surface of the mandrel comprises a plurality of upstanding projections and contiguous depressions capable of engaginy the leader tab foldback.

8. The method of claim 7 wherein the mandrel surface comprises one or more splines.

9. The method of claim 1 wherein the curl is accomplished by subjecting the leader tab to elevated temperature in an atmosphere of air or steam.

10. The method of claim 1 wherein the curled tab is removed from the completed spiral wound cell pack.

11. The method of claim 2 wherein one of the separator layers extends from the cell pack to additionally function as the leader tab.

12. The method of claim 1 wherein after the leader tab foldback has engaged the mandrel, further rotation of the mandrel is accompanied by the use of a plurality of idling pressure rolls bearing against the winding cell pack.

13. The method of claim 12 wherein the pressure rolls are made to bear against the winding cell pack after the leading edge of the cell pack has been wound upon the mandrel.

14. A method of producing an essentially small diameter spirally wound cell pack for a battery comprising steps (a), (b) and (c) according to claim 1, winding said cell pack under firm stack pressure, and the steps comprising:

d. disengaging the spirally wound cell pack from the mandrel, thereby creating an axial void in the cell pack;

e. placing said spirally wound cell pack in a substantially tight fitting cylindrical container; and f. inserting a porous or discontinuous retainer in the axial void of the cell pack formed.

15. The method of claim 14 wherein the first stack pressure is supplied by a plurality of pressure rollers adjacent the mandrel.

16. The method of claim 14 wherein the porous retainer consists of a helical plastic coil resistant to electrolyte.

* * * * *